United States Patent
Onizuka et al.

[11] Patent Number: 6,033,593
[45] Date of Patent: Mar. 7, 2000

[54] BALUN TRANSFORMER CORE MATERIAL, BALUN TRANSFORMER CORE AND BALUN TRANSFORMER

[75] Inventors: Masahiro Onizuka; Kouki Sato, both of Akita-ken, Japan

[73] Assignee: TDK Corporation, Tokyo, Japan

[21] Appl. No.: 09/094,468

[22] Filed: Jun. 10, 1998

[30] Foreign Application Priority Data

Jun. 17, 1997 [JP] Japan .................................. 9-176323

[51] Int. Cl.[7] ............................................... H01R 1/34
[52] U.S. Cl. ........................ 252/62.62; 336/233; 333/25
[58] Field of Search ...................... 252/62.63; 336/233; 333/25

[56] References Cited

U.S. PATENT DOCUMENTS

| | | | |
|---|---|---|---|
| 2,946,752 | 7/1960 | Jonker et al. | 252/62.63 |
| 3,100,852 | 8/1963 | Peek et al. | 252/62.63 |

FOREIGN PATENT DOCUMENTS

| | | |
|---|---|---|
| 33-736 | 2/1958 | Japan . |
| 34-6778 | 8/1959 | Japan . |
| 59-216151 | 12/1984 | Japan . |
| 61-208913 | 9/1986 | Japan . |
| 62-90911 | 4/1987 | Japan . |
| 3-161910 | 7/1991 | Japan . |
| 9-110432 | 4/1997 | Japan . |

OTHER PUBLICATIONS

Abstract for JP 3–161910, Jul. 11, 1991.

*Primary Examiner*—C. Melissa Koslow
*Attorney, Agent, or Firm*—Oblon, Spivak, McClelland, Maier & Neustadt, P.C.

[57] ABSTRACT

A BALUN transformer core material contains a Z-type hexagonal system ferrite having an in-plane anisotropy and a high magnetic permeability and such a high resonance frequency as to be in excess of a Snake's limiting line, and therefore, in the BALUN transformer core material, the frequency properties of the magnetic permeability are extremely good. A BALUN transformer core obtained by pressing and sintering this BALUN transformer core material has a high initial magnetic permeability and specific resistance. Moreover, a BALUN transformer obtained by applying a winding to the BALUN transformer core is provided with superior properties which are not poorer as compared with a BALUN transformer constituted of a conventional spinel ferrite, and it is a BALUN transformer having high properties which can be used in a high-frequency band of 300 MHz or more.

7 Claims, 4 Drawing Sheets

BALUN TRANSFORMER CORE MATERIAL, BALUN TRANSFORMER CORE AND BALUN TRANSFORMER

BACKGROUND OF THE INVENTION (i) Field of the Invention

The present invention relates to a BALUN transformer core material, a BALUN transformer core which is obtained by pressing and sintering the BALUN transformer core material, and a BALUN transformer which can be operated in a frequency band of 300 MHz or more.

(ii) Description of the Related Art

The BALUN transformer (Balance to Unbalance transformer: hereinafter abbreviated as BALUN) is a conversion component for smoothly connecting an unbalance circuit and a balance circuit, and used for various electronic apparatus, e.g., an antenna in a communication circuit and the like. Additionally, since the electronic apparatus have been made compact and operated at a high frequency in recent years, an essential countermeasure needs to be taken on constituent components of the electronic apparatus. The BALUN transformer is not an exception.

The BALUN transformer usually has a structure in which a conductor wire constituted of a metal is wound double around a toroidal or solenoid BALUN transformer core to form a winding (bifilar winding). As the BALUN transformer core, there is used a BALUN transformer core which is obtained by pressing and sintering a BALUN transformer core material having a high magnetic permeability, e.g., a spinel Ni—Cu—Zn ferrite as an oxide magnetic material. The spinel Ni—Cu—Zn ferrite has a relatively high magnetic permeability and specific resistance, and is not only used as the BALUN transformer core material but also frequently used in a high-frequency coil or other various electronic components.

However, the magnetic permeability of the spinel ferrite including the Ni—Cu—Zn ferrite has a frequency property. The magnetic permeability is reduced in a band of frequencies higher than frequencies at which ferrite starts resonance. Sufficient properties of the BALUN transformer cannot be obtained. There arises a problem that the core material cannot catch up with the high-frequency operation of the BALUN transformer.

To solve the problem, by lowering the magnetic permeability of the spinel ferrite and shifting the frequency at which resonance starts toward a high-frequency side to reduce a resonance loss, the BALUN transformer operable at a high frequency can be obtained. However, the ferrite has a logic of "Snake's limiting line". Therefore, it is impossible to raise the frequency at which the resonance starts up to a high-frequency band exceeding the limitation. A BALUN transformer cannot be realized which provides an excellent property in the high-frequency band.

SUMMARY OF THE INVENTION

An object of the present invention is to provide a BALUN transformer core material and a BALUN transformer core which can realize a high-property BALUN transformer which can be operated in a high-frequency band of 300 MHz or more and to provide a BALUN transformer which can be operated in a high-frequency band of 300 MHz or more.

To attain this and other objects, the present invention provides a BALUN transformer core material which contains a Z-type hexagonal system ferrite. Since the Z-type hexagonal system ferrite contained in the BALUN transformer core material has an in-plane anisotropy and a high magnetic permeability and a resonance frequency is in excess of the Snake's limiting line, the frequency properties of the magnetic permeability are extremely good.

Furthermore, the BALUN transformer core of the present invention is constituted of a sintered material of a ferrite obtained by pressing and sintering the BALUN transformer core material which contains the Z-type hexagonal system ferrite. The BALUN transformer core has a high initial magnetic permeability and specific resistance.

Moreover, the BALUN transformer of the present invention is obtained by applying a winding to the BALUN transformer core having the high magnetic permeability constituted of a sintered material of the ferrite obtained by pressing and sintering the BALUN transformer core material containing the Z-type hexagonal system ferrite. The BALUN transformer is provided with superior properties which are not poorer as compared with the BALUN transformer constituted of a conventional spinel ferrite, and it can also be used in a high-frequency band of 300 MHz or more at which the properties of the conventional BALUN transformer are deteriorated. The compact BALUN transformer with high properties have opened up possibilities of making chips.

DETAILED DESCRIPTION OF THE PREFERRED EMBODIMENTS

Figure 1:
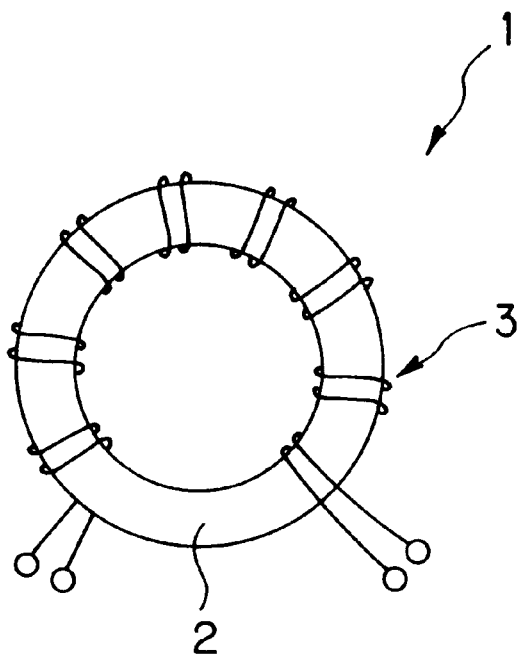
FIG. 1 is a plan view showing an example of a BALUN transformer according to the present invention.

Preferable embodiments of the present invention will be described with reference to the accompanying drawings.

BALUN Transformer Core Material

First, a BALUN transformer core material of the present invention will be described.

The BALUN transformer core material of the present invention is characterized by containing a Z-type hexagonal system ferrite. The three-component hexagonal system ferrite of $Fe_2O_3$—BaO—Mo (wherein M is at least one selected from divalent metal atoms such as Co, Ni, Zn, Mg, Mn, Fe, Cu and Sr) includes an M-type, an X-type, a Y-type and a W-type in addition to the Z-type, and these types are generically called a forroxplana.

The Z-type hexagonal system ferrite which can be used in the present invention preferably contains Fe, Ba and Co as constitutional metal atoms, and in this case, the ratio of the constitutional components $Fe_2O_3$, BaO and CoO can be decided in the following range.

$Fe_2O_3$: 60 to 80 mol %

BaO: 10 to 30 mol %

CoO: 5 to 20 mol %

Furthermore, the Z-type hexagonal system ferrite which can be used in the present invention preferably contains Sr as an additional constitutional metal atom, has an insertion loss of −5 dB or more in a frequency band of 300 MHz to 1.9 GHz, and in this case, the ratio of the constitutional components $Fe_2O_3$, BaO, CoO and SrO can be decided in the following range.

$Fe_2O_3$: 60 to 80 mol %
BaO: 10 to 30 mol %
CoO: 5 to 20 mol %
SrO: 0.5 to 20 mol %

The structure of the above-mentioned Z-type hexagonal system ferrite can be confirmed by an X-ray diffraction (XRD).

The content of the Z-type hexagonal system ferrite in the BALUN transformer core material is in the range of 60 to 100% by weight, and if the content of the Z-type hexagonal system ferrite is less than 60% by weight, the magnetic permeability inconveniently decreases in a high-frequency band.

Furthermore, the BALUN transformer core material of the present invention may contain one or more of PbO, $SiO_2$ and the like in an amount of 0.01 to 10% by weight, and it is particularly preferred to contain Pb and Si. This BALUN transformer has an insertion loss of −5dB or more in a frequency band of 200 MHz to 1.2 GHz. In this case, PbO, $SiO_2$ and the like may be added at the time of the constitutional components of the Z-type hexagonal system ferrite are blended, or after the constitutional components of the Z-type hexagonal system ferrite have been blended, presintered and then ground, PbO and $SiO_2$ may be added. Moreover, also when a Pb—Si system glass is added, the same effect can be obtained.

BALUN transformer Core

Next, a BALUN transformer core of the present invention will be described.

The BALUN transformer core of the present invention is obtained by mixing the BALUN transformer core material (which is preliminarily sintered and then ground) of the present invention with the binder, pressing the mixture into a predetermined configuration, and then really sintering the thus pressed material at a high temperature.

As the binder, an organic compound such as polyvinyl alcohol (PVA) or polyethylene glycol (PEG), or water can be used. Furthermore, a mixture of PVA and PEG, or a mixture of two or more of PVAs having different polymerization degrees can be used. The mixing proportion of the binder and the BALUN transformer core material can be set in such a manner that 1 to 15 parts by weight of binder is mixed with 100 parts by weight of the BALUN transformer core material. Alternatively, the binder may contain 0 to 2.0% by weight of one type or more types of dispersing agent such as a carboxylic acid dispersant, a sulfonic acid dispersant and the like.

The configuration of the BALUN transformer core according to the present invention may be the same as the configuration of the conventional BALUN transformer core such as a toroidal configuration, a solenoid configuration, a configuration of a pair of glasses or the like.

The magnetic permeability (about 6 to 15) and the specific resistance ($10^6$ Ω·cm or more) of the BALUN transformer core of the present invention are about the same degree as that of the conventional BALUN transformer core in which the spinel Ni—Cu—Zn ferrite is used, and the BALUN transformer core of the present invention has excellent characteristics as the BALUN transformer core. When the specific resistance of the BALUN transformer core is low ($10_4$ Ω·cm or less), the insulation between the core and the winding, and between core electrodes cannot be kept unfavorably.

BALUN Transformer

Next, a BALUN transformer of the present invention will be described.

The BALUN transformer of the present invention has a structure in which a conductor wire constituted of a metal is wound double around the BALUN transformer core of the present invention to form a winding (bifilar winding).

Figure 2:
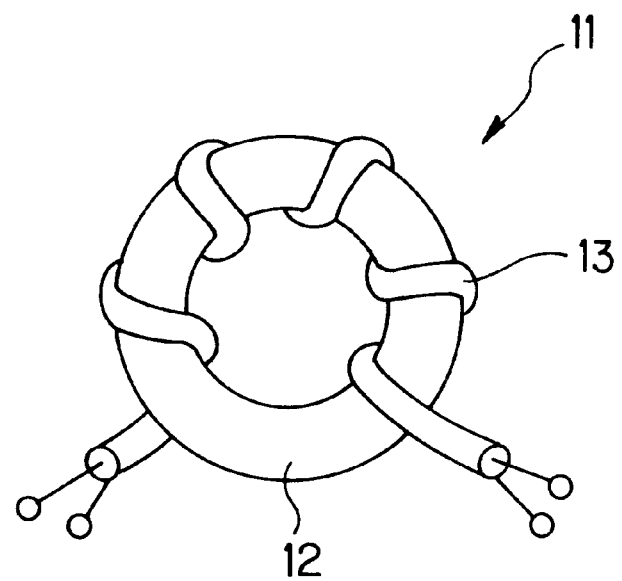
FIG. 2 is a plan view showing another example of the BALUN transformer according to the present invention.
Figure 3:
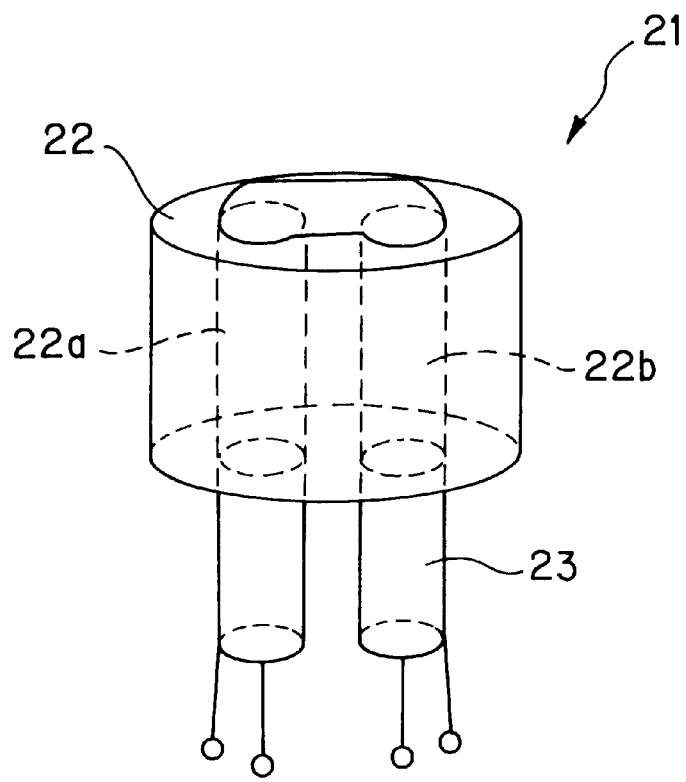
FIG. 3 is a perspective view showing another example of the BALUN transformer according to the present invention.

Examples of the BALUN transformer according to the present invention are shown in FIGS. 1 to 3. A BALUN transformer 1 of the present invention shown in FIG. 1 is constituted by winding a paired wire 3 around a toroidal BALUN transformer core 2 and thus applying a winding. A BALUN transformer 11 of the present invention shown in FIG. 2 is constituted by winding a coaxial wire 13 around a toroidal BALUN transformer core 12 and thus applying a winding. Furthermore, a BALUN transformer 21 of the present invention shown in FIG. 3 is constituted by applying a coaxial wire 23 to a BALUN transformer core 22 configured like a pair of glasses which is provided with through holes 22a and 22b.

The number of windings in the BALUN transformer of the present invention can be appropriately set in accordance with the operating purpose of the BALUN transformer, the configuration of the BALUN transformer core, the used conductor wire and the like. For example, about one turn to three turns of winding may be used.

Embodiment

Next, concrete examples of the present invention will be shown to describe the present invention in more detail.

[Preparation of BALUN Transformer Cores (samples 1–7)]

As constitutional components of a Z-type hexagonal system ferrite, $Fe_2O_3$, $BaCO_3$, $SrCO_3$ and $Co_3O_4$ were weighed in a ratio shown in Table 1, and PbO and $SiO_2$ were further added as trace additives in a ratio shown in Table 1, and the resultant mixtures (7 kinds) were each wet-blended in a ball mill. In Table 1, $BaCO_3$, $SrCO_3$ and $Co_3O_4$ are shown in terms of BaO, SrO and CoO, respectively. In this connection, the used raw materials are not limited to the above-mentioned materials, and other compounds in which the similar metal elements are contained may be used so that the ratio of the metal elements in the mixture might be the same as in the case that the raw materials shown in Table 1 are used.

Next, the material mixed in the ball mill was preliminarily sintered at a temperature of 1200° C. for 2 hours in an air atmosphere, and afterward, it was wet-ground to obtain BALUN transformer core materials (samples 1 to 7). The crystal structure of each of the thus obtained BALUN transformer core materials was measured by an X-ray diffraction (XRD), and as a result, it was confirmed that each BALUN transformer core material contained a Z-type hexagonal system ferrite.

[Preparation of BALUN transformer cores (samples 1 to 7)]

Figure 4:
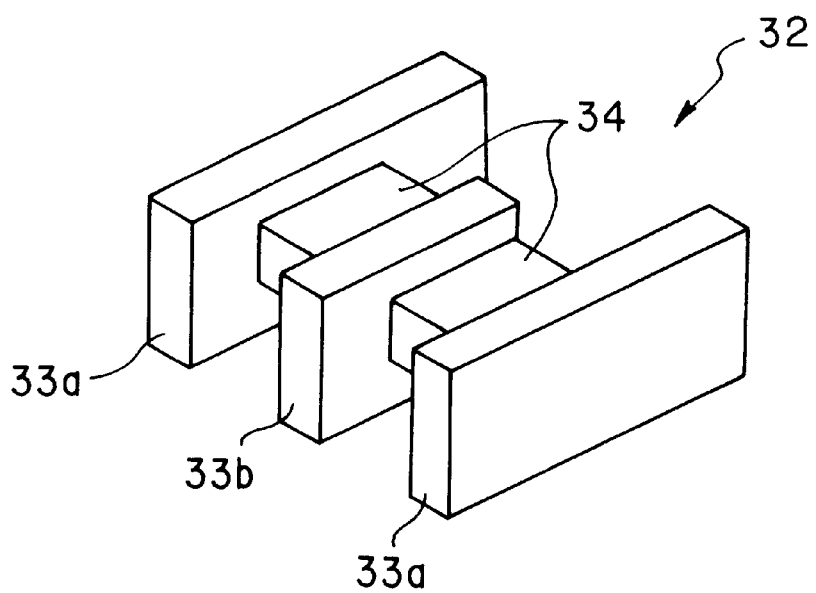
FIG. 4 is a perspective view showing a configuration of a BALUN transformer core in an embodiment.

The BALUN transformer core materials (samples 1 to 7) obtained by the above-mentioned procedure were used to prepare pastes of the following composition, and these pastes were then pressed into toroidal configurations, E-shaped BALUN transformer cores 32 in which three blocks 33a, 33a, 33b were joined via two blocks 34 as shown in FIG. 4, and disk-shaped samples (pressing pressure=1 t/cm²). Afterward, they were really sintered at temperatures shown in Table 1 for 2 hours in an air atmosphere.

Paste Composition

BALUN transformer core material . . . 90 parts by weight
binder . . . 10 parts by weight

[an 6% aqueous solution of polyvinyl alcohol (PVA124, manufactured by Kurare Co., Ltd.)]

invention have initial magnetic permeabilities of 6 to 15 and specific resistances of $10_6$ Ω·cm or more, which are not

TABLE 1

| Sample | Ratio of Components | | | | | | Sintering Temp. (° C.) |
|---|---|---|---|---|---|---|---|
| | $Fe_2O_3$ (mol %) | BaO (mol %) | SrO (mol %) | CoO (mol %) | PbO (mol %) | $SiO_2$ (mol %) | |
| Sample 1 | 70.59 | 19.15 | 0.00 | 10.27 | 2.00 | 0.62 | 1200 |
| Sample 2 | 73.50 | 17.65 | 0.00 | 8.85 | 2.00 | 0.62 | 1200 |
| Sample 3 | 68.50 | 19.74 | 0.00 | 11.77 | 2.00 | 0.62 | 1200 |
| Sample 4 | 70.59 | 12.78 | 6.38 | 10.27 | 0.00 | 0.00 | 1150 |
| Sample 5 | 70.59 | 6.32 | 12.83 | 10.27 | 0.00 | 0.00 | 1150 |
| Sample 6 | 70.59 | 12.78 | 6.38 | 10.27 | 2.00 | 0.62 | 1200 |
| Sample 7 | 70.59 | 17.65 | 0.00 | 11.77 | 0.00 | 0.00 | 1300 |

[Preparation of BALUN Transformer Cores (Comparative samples)]

Additionally, a comparative sample was prepared. First, NiO, CuO, ZnO and $Fe_2O_3$ were weighed so as to be $42NiO \cdot 4CuO \cdot 6ZnO \cdot 48Fe_2O_3$ in terms of an oxide composition (mol %). After wet-blending in a ball mill, a preliminary calcination was performed at a temperature of 900° C. in an air atmosphere for two hours. Thereafter, a wet-grinding was performed in the ball mill to form a BALUN transformer core material constituted of a spinel Ni—Cu—Zn ferrite. By using this BALUN transformer core material, a paste was prepared in the same manner as aforementioned. Then, a toroidal configuration, an E-shaped BALUN transformer core (a comparative sample) and a disk-shaped sample (a comparative sample) were prepared.

[Measurement of Properties of BALUN transformer cores]

Next, for the respective BALUN transformer cores (samples 1 to 7 and a comparative sample), initial magnetic permeabilities and specific resistances were measured in the following measurement manner, and the results are shown in Table 2.

Measurement method of initial magnetic permeability

A winding is applied to a BALUN transformer core having a toroidal configuration by winding a pair line thereon, and the initial magnetic permeability is then measured in accordance with an inductance method prescribed in JIS C2561 by the use of an LCR meter (HP4275, manufactured by Furet Paccard Co., Ltd.).

Measurement Method of Specific Resistance

An In—Ga electrode is placed on an end surface of a disc-shaped sample. The insulation resistance is measured with an insulation testing set (SUPER MEG OHM METER SM-5E manufactured by Toa Denpa Kogyo Kabushiki Kaisha). The specific resistance is calculated from an outside dimension of the sample.

TABLE 2

| Sample | Initial Magnetic Permeability | Specific Resistance (Ω · cm) |
|---|---|---|
| Sample 1 | 13 | $10^8$ |
| Sample 2 | 15 | $10^7$ |
| Sample 3 | 10 | $10^8$ |
| Sample 4 | 10 | $10^8$ |
| Sample 5 | 6 | $10^8$ |
| Sample 6 | 9 | $10^7$ |
| Sample 7 | 10 | $10^6$ |
| Comp. Sample | 17 | $10^7$ |

As shown in Table 2, it has been confirmed that the BALUN transformer cores (samples 1–7) of the present invention have initial magnetic permeabilities of 6 to 15 and specific resistances of $10^6$ Ω·cm or more, which are not poorer as compared with the comparative sample in which a spinel Ni—Cu—Zn ferrite is used.

[Preparation of BALUN Transformer]

Figure 5:
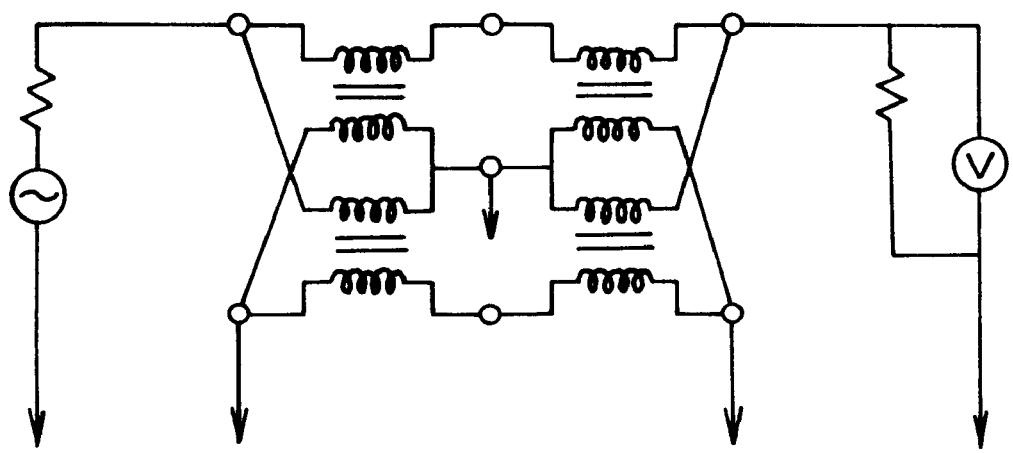
FIG. 5 is a circuit diagram showing a measurement circuit of an insertion loss in the embodiment.
Figure 6:
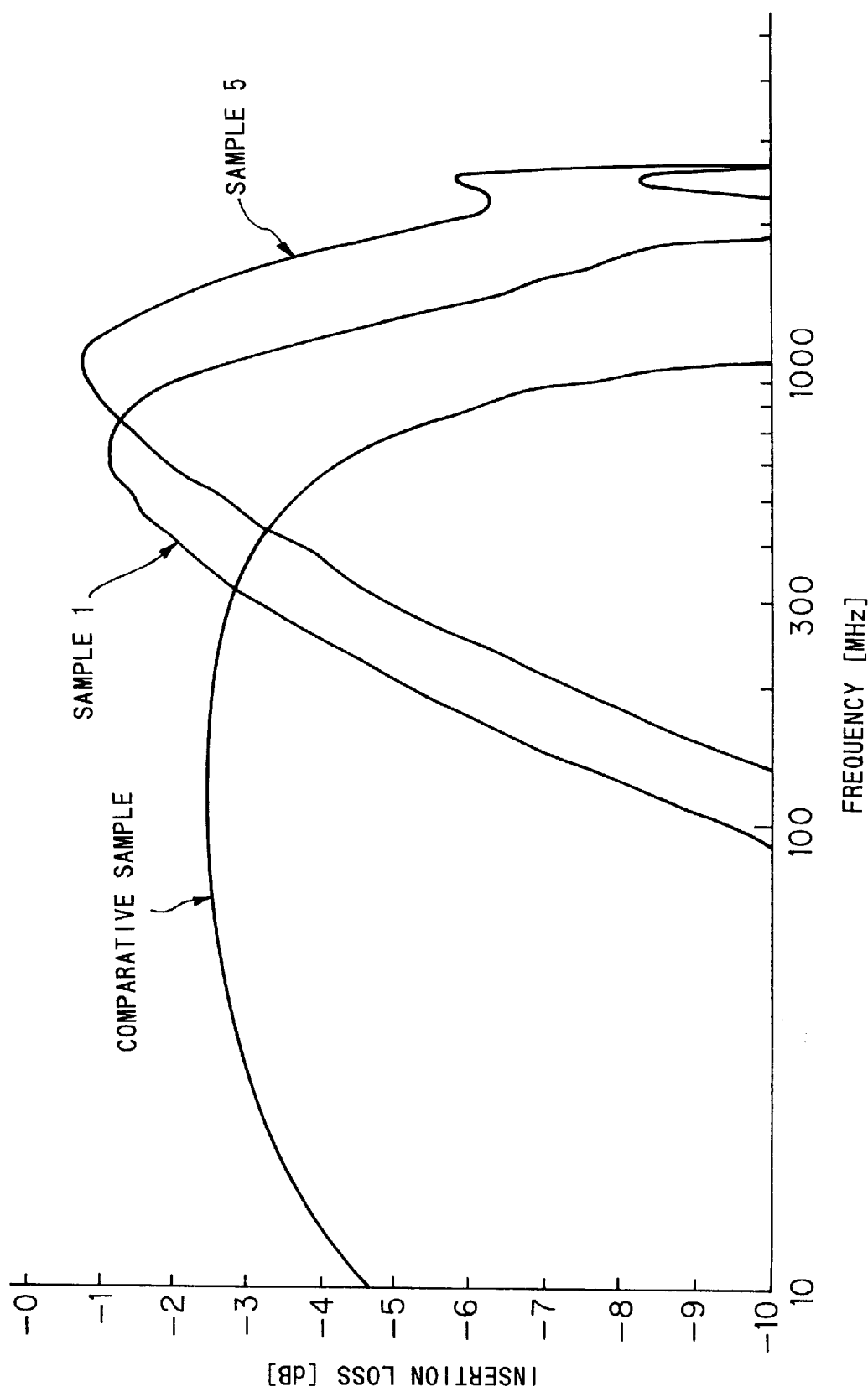
FIG. 6 is a graph showing measurement results of the insertion loss of the BALUN transformer in the embodiment.

Subsequently, paired wires were wound around the block of the sample 1, the sample 5 and the E-shaped BALUN transformer core as the comparative sample to form a winding (one turn). For the prepared BALUN transformers, the insertion loss was measured in a measurement circuit shown in FIG. 5 by using a network analyzer (HP-8753 manufactured by Furet Paccard Co., Ltd.). The results are shown in FIG. 6. Additionally, in the measurement circuit shown in FIG. 5, to enhance a measurement precision, two BALUN transformers prepared as aforementioned are connected in series. Therefore, the insertion loss shown in FIG. 6 is a double value. Therefore, when the insertion loss is −3 dB in FIG. 6, the insertion loss of one BALUN transformer is −1.5 dB. The closer to 0 dB the insertion loss is, the more superior the property of the BALUN transformer becomes.

As shown in FIG. 6, a frequency band in which an insertion loss of −5 dB or more can be obtained is 200 MHz to 1.2 GHz in the sample 1 of the BALUN transformer of the present invention, and 300 MHz to 1.9 GHz in the sample 5 of the BALUN transformer of the present invention. Furthermore, a frequency band in which an insertion loss of −2 dB or more can be obtained is 400 MHz to 870 MHz in the sample 1 of the BALUN transformer of the present invention, and 590 MHz to 1.3 GHz in the sample 5 of the BALUN transformer of the present invention. The BALUN transformers of the present invention have remarkably small insertion losses in the high-frequency band as compared with the BALUN transformer of the comparative sample. It has been confirmed that the BALUN transformer of the present invention can be operated in a high-frequency band of 300 MHz or more.

What is claimed is:

1. A BALUN transformer which is constituted by applying a winding to a BALUN transformer core having a high magnetic permeability, wherein the BALUN transformer core is a BALUN transformer core constituted of a sintered material of a Z-type hexagonal system ferrite obtained by pressing and sintering a BALUN transformer core material containing the Z-type hexagonal system ferrite.

2. The BALUN transformer according to claim 11 wherein said Z-type hexagonal system ferrite contains Fe, Ba and Co as constitutional metal atoms.

3. The BALUN transformer according to claim 2 wherein said Z-type hexagonal system ferrite contains Sr as a constitutional metal atom.

4. The BALUN transformer according to claim 1 wherein the content of said Z-type hexagonal system ferrite of the BALUN transformer core material is 60% by weight or more.

5. The BALUN transformer according to claim 4 wherein the BALUN transformer core material contains Pb and Si in addition to said Z-type hexagonal system ferrite.

6. The BALUN transformer according to claim 3 wherein said transformer has an insertion loss of −5 dB or more in a frequency band of 300 MHz to 1.9 GHz.

7. The BALUN transformer according to claim 5 wherein said transformer has an insertion loss of −5 dB or more in a frequency band of 200 MHz to 1.2 GHz.

* * * * *

UNITED STATES PATENT AND TRADEMARK OFFICE
CERTIFICATE OF CORRECTION

PATENT NO. : 6,033,593
DATED : MARCH 7, 2000
INVENTOR(S) : Masahiro ONIZUKA, ET AL.

It is certified that error appears in the above-identified patent and that said Letters Patent is hereby corrected as shown below:

Column 2, line 53, "$Fe_2O_3$-BaO-Mo" should read --$Fe_2O_3 \cdot BaO \cdot MO$--.

Signed and Sealed this

Twenty-ninth Day of May, 2001

Attest:

NICHOLAS P. GODICI

*Attesting Officer*   *Acting Director of the United States Patent and Trademark Office*